3,271,951
GAS TURBINES USING SOLID FUELS
Frederick Nettel, 173 Chapel Road, Manhasset,
Long Island, N.Y.
Filed Oct. 22, 1963, Ser. No. 318,028
3 Claims. (Cl. 60—39.46)

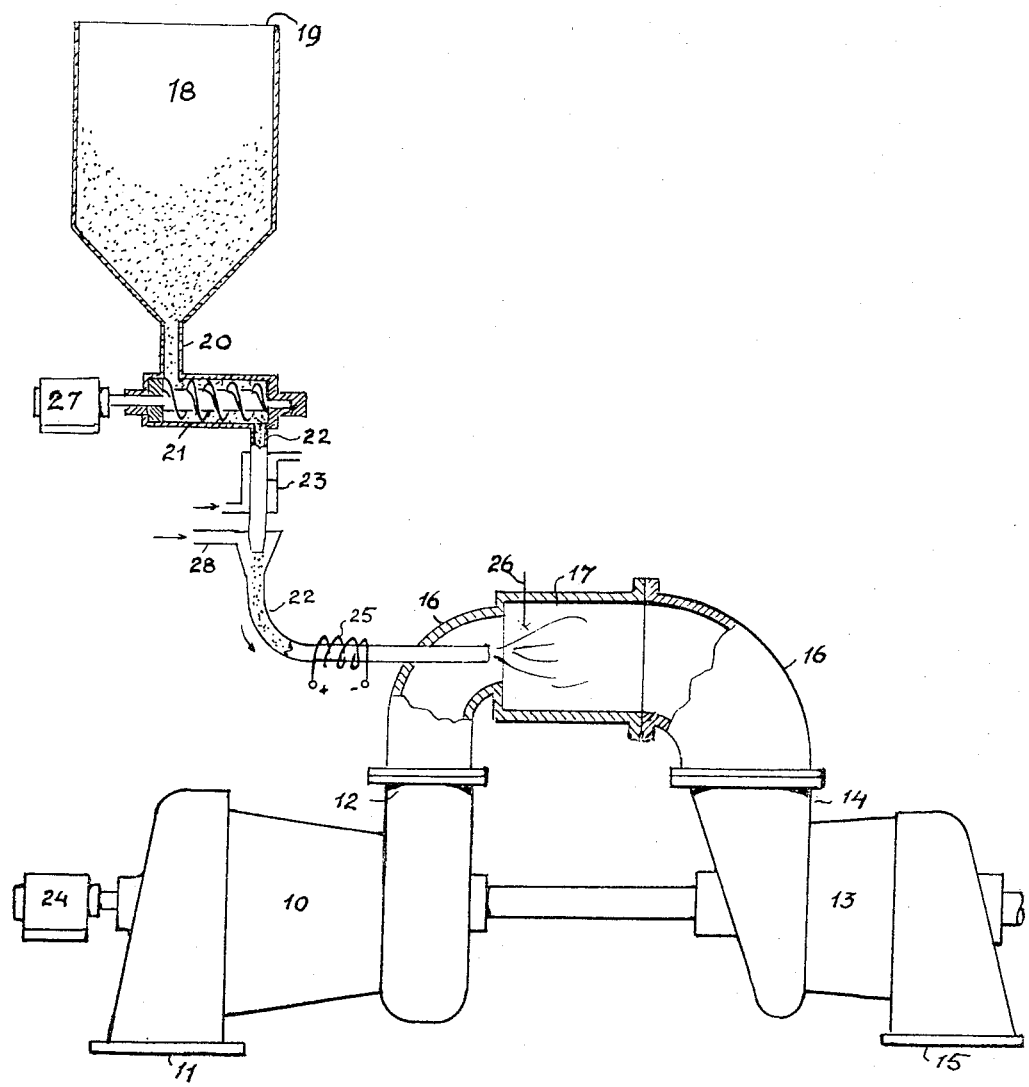

This invention relates to gas turbines involving method and means for simple and efficient use of solid hydrocarbons as fuels.

At present liquid fuels are mostly used in gas turbine plants in stationary plants and on vehicles of any kind. While liquid fuels have advantages in handling, they also create serious hazards where highly volatile and easily inflammable hydrocarbons must be employed. Even kerosene, frequently used in aircraft turbines, does not eliminate fire hazards completely. Also the complicated apparatus and tanks are often objectionable. When aircraft have to operate far away from their supply bases, special fuel-tanker planes are necessary, which is not only costly but hazardous.

Obviously, use of solid fuels which can be dropped, for example, in gunny bags from ordinary cargo planes near moving vehicles or airfields will greatly simplify operations even under the most difficult conditions. If, moreover, fuels are used which do not easily ignite while solid, can be stored in the open, even under water, the obtainable advantages appear overwhelming.

It is the main object of this invention to realize these advantages. These and other and further advantages will become clear from the following specification when taken together with the accompanying drawing which shows in diagrammatic form an embodiment of my invention by way of non-limiting example.

The sole figure illustrates a gas turbine plant with container for solid fuel, fuel feeder, fuel tube cooler and fuel heater for starting.

This invention envisages the use of hydrocarbons, including such containing oxygen, which are solid at ambient temperatures, but which melt and evaporate substantially completely when heated to temperatures in the range up to about 250° C. Non-limiting examples are naphthalene, ceresin, paraffins and other waxes, anthracene, cresol, carbolic acid.

Amongst these fuels naphthalene is at present preferred, but mixtures of several fuels, including normally liquid fuels, may be used according to this invention, as long as these mixtures are solid at ambient temperatures.

The use of naphthalene in reciprocating engines is known, however, the necessity to use a special heat source, mostly waste exhaust heat, to melt and evaporate it under all operating conditions makes special devices necessary which are not always justified.

The main object of my invention is achieved in gas turbines using naphthalene or other solid fuels, by eliminating the need of a special heat source for melting and evaporating the fuel, and by using the heat of compression of the compressed air issuing from the compressor to accomplish this in the simplest possible manner.

Gas turbines work with various pressure ratios suiting special purposes, from below 6 to 10 and more. Under these conditions the air temperatures are varying from about 280° to 400° C.

Since crude naphthalene, for example, is melting at about 78° C. and boiling at 220° C., the above mentioned air temperatures are sufficient for melting and evaporating it, and very ample in aircraft gas turbines which work with high pressure ratios.

Reverting in more detail to the drawing in which 10 denotes the air compressor with air intake at 11 and discharge at 12. 13 is the gas turbine with inlet at 14 and outlet at 15. 16 is a conduit connecting the compressor with the turbine, with interposed combustion chamber 17. 18 is a container for solid fuel in particulate form, open at the top 19 and with outlet duct at its bottom and connected to a screw-type pressure feeder 21, which serves to feed the fuel via the tube 22 into the combustion chamber against the air pressure prevailing therein. In order to prevent heat from the combustion chamber to reach the screw feeder via the tube 22, a cooling device 23 may be provided as shown. Air or water may be used for cooling.

During starting, the gas turbine set is rotated, as usual by means of a starting motor 24. The air issuing from the compressor 10 is during starting not hot enough to melt and evaporate the fuel entering the combustion chamber through the tube 22. To facilitate starting, a heating device 25 for the tube 22 is provided between the cooling device and the combustion chamber 17. This heater, which may be of any known kind, causes the fuel to melt and evaporate during starting only. After the gas turbine has reached full speed, the air temperature in 12 will have risen sufficiently, so that the heater can be cut off. An ignition device of any known type 26 may be provided in the combustion chamber.

Fuel control may be achieved by the motor 27 for the screw feeder, by regulating the motor speed by any known means.

In vehicles it is not possible to rely on gravity for moving solid through tubes. This invention therefore provides for an inlet 28 for compressed air into the tube 22 as shown, so that the air can reliably move the fuel particles into 17 even over long distances.

It is immaterial for the purposes of my invention what types of rotary machines are employed, what particular solid fuel is used, and what purpose the gas turbine serves.

It is further immaterial whether a normally solid fuel is utilized by itself or in temporay or continuous simultaneous operation with other liquid or gaseous fuels.

Instead of the screw feeder shown, other devices such as cell-wheel feeders or sluices, for examples, may be used for pressurizing the fuel.

Having now shown and described an embodiment of my invention, I wish it to be understood that it is not limited to the special form and arrangement disclosed herein, nor to the following claims.

What I claim is:

1. In the method of fueling a gas turbine plant with hydrocarbons substantially completely vaporizable by heating them and having melting points between ambient temperatures and +250° C., said gas turbine plant comprising air compressor means, gas turbine means, conduit means connecting the outlet of said compressor means with the inlet of said gas turbine means, combustion chamber means interposed in said conduit means, the steps of introducing particulate solid fuel into the stream of hot compressed air issuing from said compressor means, for melting and evaporating said fuel by the heat of compression of said air, and subsequently burning the resulting vapors in said air.

2. A gas turbine plant comprising an air compressor, a gas turbine, conduit means connecting the outlet of said compressor with said turbine, a combustion chamber interposed in said conduit means, a container for solid particulate fuel substantially completely vaporizable by heating, a tube connecting said container with said combustion chamber where the fuel melts and evaporates in the hot air issuing from said compressor, and subsequently burns to form driving gases for said gas turbine, cooling means for the solid particulate fuel interposed in said tube between the fuel container and said combustion chamber for preventing premature melting of the fuel by heat conduction from the combustion chamber.

3. A gas turbine plant comprising an air compressor, a gas turbine, conduit means connecting the outlet of said compressor with said turbine, a combustion chamber interposed in said conduit means, a container for solid particulate fuel substantially completely vaporizable by heating, a tube connecting said container with said combustion chamber where the fuel melts and evaporates in the hot air issuing from said compressor, and subsequently burns to form driving gases for said gas turbine, heating means for the particulate fuel, interposed in the tube connecting the fuel container with the combustion chamber, for melting and evaporating the particulate fuel flowing through said tube during the starting of the gas turbine when the temperature of the air at the outlet from said air compressor is not yet high enough to melt and evaporate the fuel.

References Cited by the Examiner
UNITED STATES PATENTS

| | | | |
|---|---|---|---|
| 2,616,252 | 11/1952 | Robinson et al. | 60—39.46 X |
| 2,616,256 | 11/1952 | Davy et al. | 60—39.46 |
| 2,923,575 | 2/1960 | Allen | 60—39.46 X |
| 3,069,854 | 12/1962 | Toulmin | 60—39.02 |

MARK NEWMAN, *Primary Examiner.*

D. HART, *Assistant Examiner.*